Figure 9:
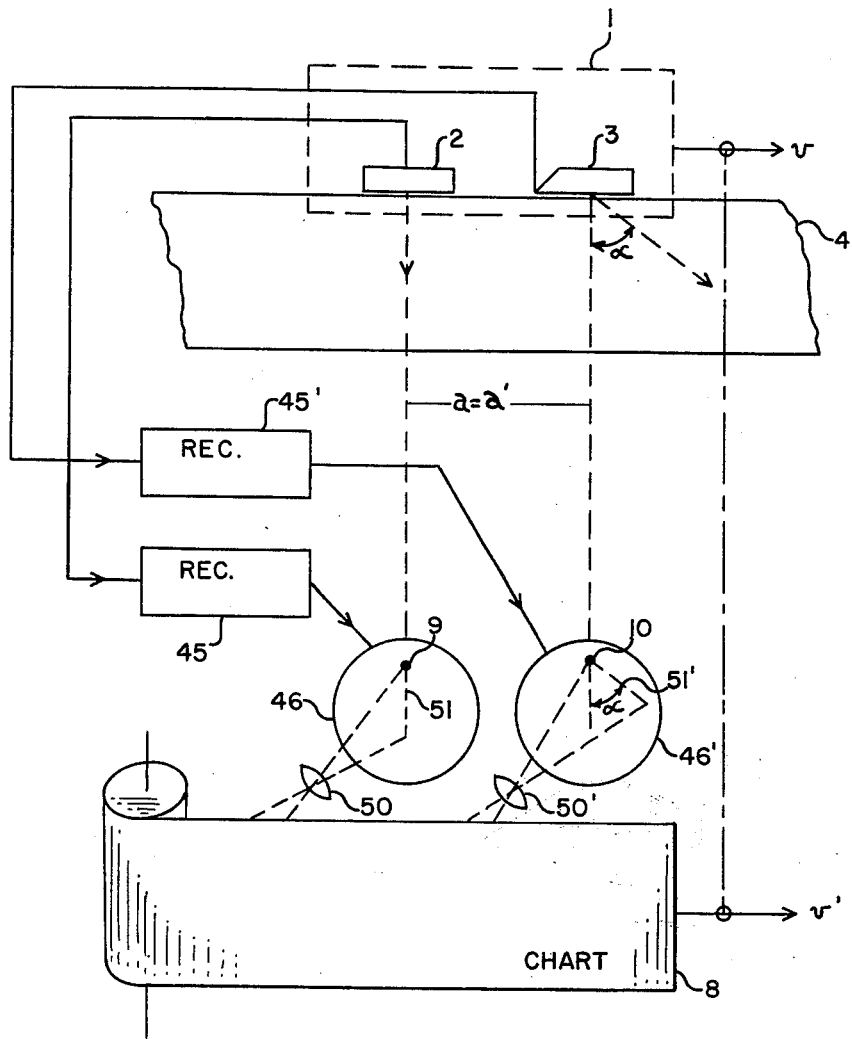

June 2, 1964 K. O. WERNER 3,135,109
DEVICES FOR DETECTING AND RECORDING DEFECTIVE
SPOTS IN METAL MEMBERS
Filed Jan. 19, 1961 5 Sheets-Sheet 1
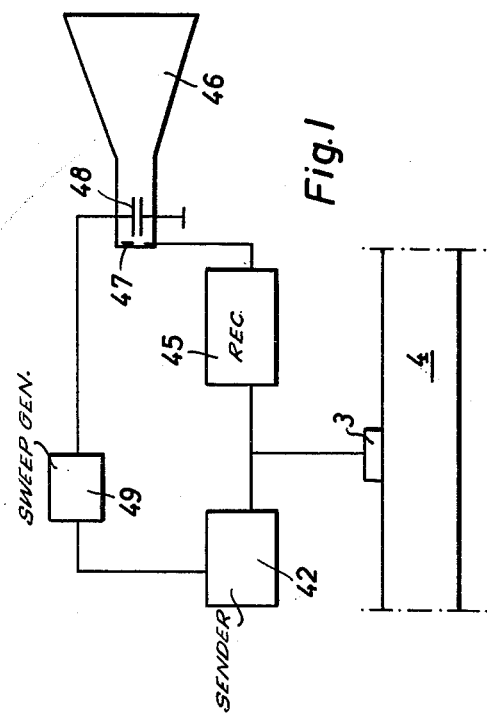
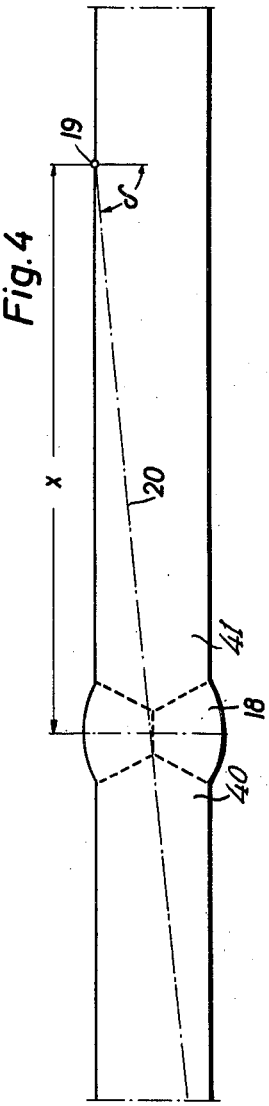
INVENTOR
Karl O. Werner
BY
Watson, Cole, Grindle & Watson
Attys.

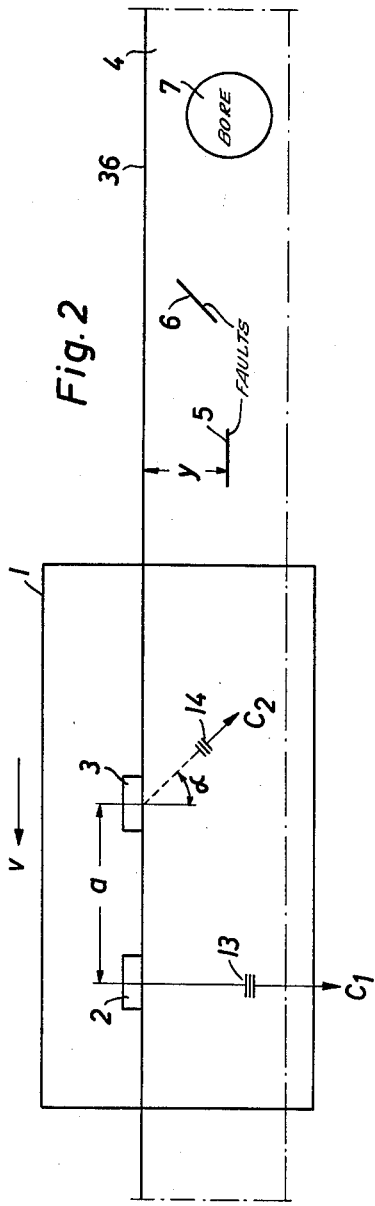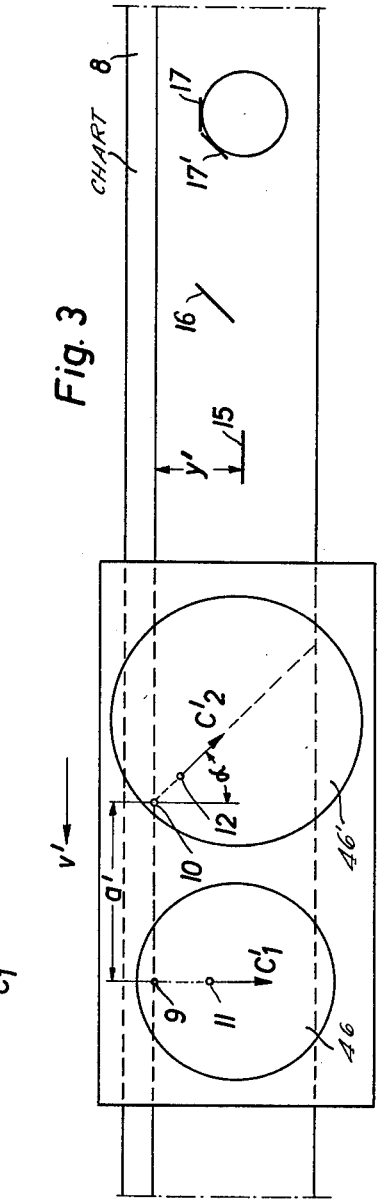

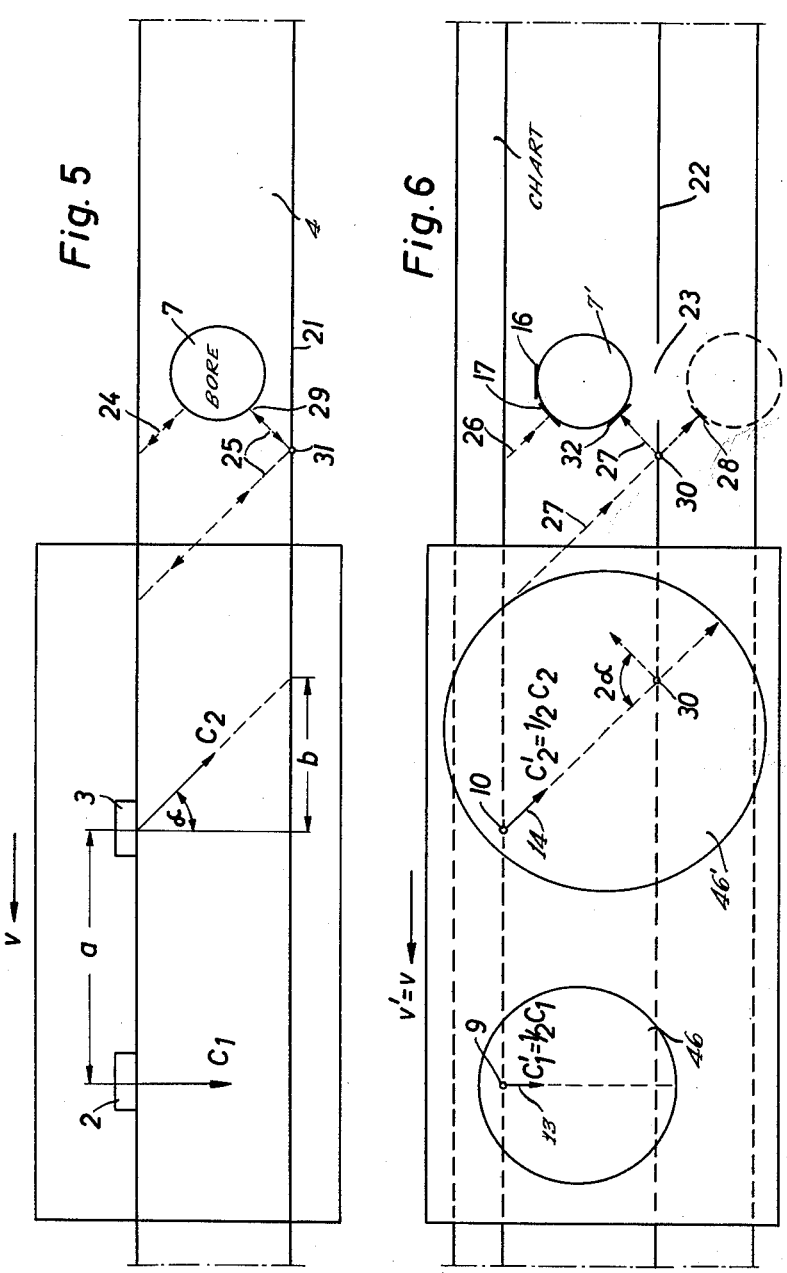

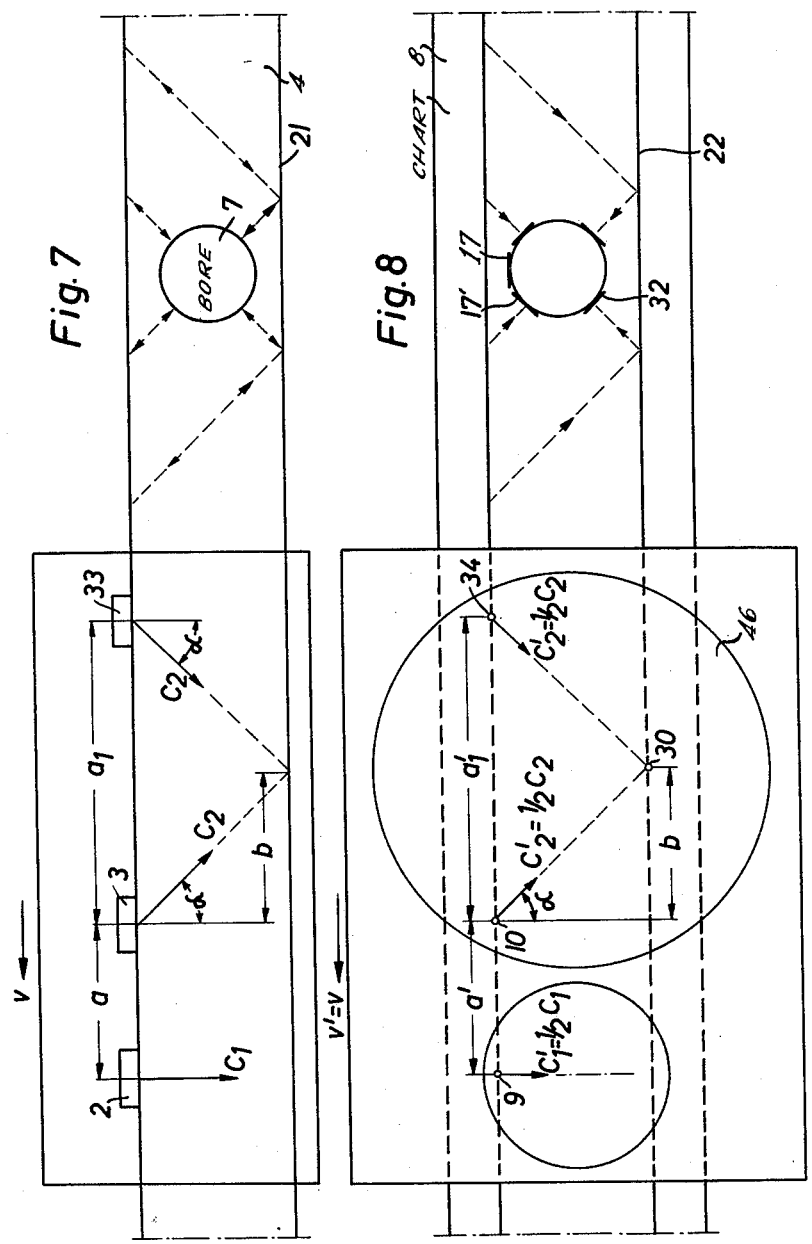

United States Patent Office 3,135,109
Patented June 2, 1964

3,135,109
DEVICES FOR DETECTING AND RECORDING
DEFECTIVE SPOTS IN METAL MEMBERS
Karl O. Werner, 10 Pionierstrasse, Minden,
Westphalia, Germany
Filed Jan. 19, 1961, Ser. No. 83,671
Claims priority, application Germany Feb. 16, 1960
5 Claims. (Cl. 73—67.8)

This invention relates to devices for detecting in a workpiece flaws which are angularly disposed relative to the surface of the workpiece and for determining the true position and location of these flaws.

The ultrasonic testing of workpieces according to the echo-impulse process will permit a photographic recording when (1) the positive impulse voltages are brought to the normally negative control grid of a cathode ray tube instead of to the vertical deflecting plates of said tube and said impulses will charge said grid positively with respect to the cathode of the tube, so that a brightening up of the deflection line of the cathode-ray tube will only occur whenever an impulse is either sent forth or received and (2) this luminescent screen image is depicted on a light sensitive recording chart, which is moved in proportion to the testing speed.

It is known in the art to carry out the testing for example by moving a vertical transducer across the surface of a rail or profiled metal member and at the same time by having a recorder chart move past the cathode ray tube, perpendicular to its direction of time sweep. In this manner all defective surfaces which are lying at right angles to the sound beam, will be depicted in their true position and location. However, the picture is still incomplete insofar as defective surfaces which do not form right angles to the sound ray. This deficiency has until now been eliminated by using a combination of the vertical transducer and one or more angular transducers. In this case the directions of the angular transducers have been arranged symmetrically to the direction of rays from the vertical transducer and they are located in the plane which is determined by a line perpendicular to the surface of the test member and by the testing direction. The direction of time sweep of the cathode ray tube of the angle transducer, at the same time, remains parallel to that of the cathode ray tube of the vertical transducer and thus also perpendicular to the advance of the recording chart. The advantage as compared to the first mentioned method resides in the ability to depict defective surfaces which are not parallel to the surface of the workpiece.

It is still a defect of this process that the picture of these oblique surfaces is made through angle radiators in different oblique-angled coordinate systems and thus renders exploration difficult. It is the purpose of the present invention to eliminate this deficiency, and the basic idea of the invention is as follows:

Time deflections of the cathode rays, which correspond to the individual ultrasonic transducers, are selected by known means in such a manner as to guarantee and carry out the following:

(1) The directions of the time deflections together with the direction of advance of the recording chart are synchronized to form optically the same angles as do the directions of incidence of the corresponding ultrasonic impulses with the direction of advance of the sample specimen or member.

(2) The ratio of velocity of the recorder chart to the velocity of the sample to be tested is proportional to the ratio of the distances of the starting points of the time deflections shown on the recorder chart to the distances of the corresponding ultrasonic transducers.

(3) The deflection speed in the plane of the recorder chart is to half of the speed of the ultrasonic impulses as the speed of advance of the recorder chart is relative to the speed of advance of the sample specimen. This is desired because the ultrasonic impulse controls the control grid positively from that moment when the ultrasonic impulse has again reached the ultrasonic transducer. Consequently, the ultrasonic impulse has passed twice through the distance between the transformer and the place of reflection.

These facts are clarified more in detail by actual examples as illustrated in the accompanying drawings in which:

FIGURE 1 is a wiring diagram of a system for receiving ultrasonic echo impulses in a cathode ray tube, FIG. 2 is a diagrammatic view of a ray director into and on a metal member to be tested, FIG. 3 is a diagrammatic view of a modified system of FIG. 2, FIG. 4 is a diagram of a test surface in a butt-welded sheet metal member, FIG. 5 is a diagram illustrating the recording of a plane-parallel member with an annular bore by means of a combined vertical and angle ray director, FIG. 6 is a diagram similar to FIG. 5 as applied to a rail, FIG. 7 is a diagram illustrating the recording of a member similar to FIG. 5 but with one vertical ray director and two angular ray directors, FIG. 8 is a view similar to FIG. 7 illustrating the combination of the vertical and angular ray directors, and FIG. 9 is a diagrammatic system view showing synchronous movement of recording medium with transducers and position relationship between the transducers and the recording source.

Referring to FIG. 1, the rectangle 42 represents a sender which in quick succession high-frequency impulses are directed on a ray director or transducer 3 which is in contact with the member 4 to be tested. The directed and received ultra-sonic echoes are amplified by a receiver and amplifying unit 45 and directed to a cathode ray tube 46. The cathode ray tube 46 includes a cathode cylinder 47 which receives the ultra-sonic echoes. The time deflecting plates 48 will receive a time deflecting impulse from a generator 49 which at the same time operates the sender synchronously with the time deflections.

FIGS. 2 and 3 show a combination 1 of a vertical transducer 2 and an angle transducer 3, which radiates into the sample specimen or member 4 at an angle of $\alpha=45°$, said transducers or ray directors having a distance $a$ from one another, and said two transducers are moved with a speed $v$ across a sample specimen 4 which has a fault 5 parallel to the surface 36, and another fault 6 obliquely at a 45° angle relative to the surface, and having a circular bore 7. As shown in the system view of FIGURE 9, and related in the views of FIGURES 2 and 3, each of the two transducers is associated with a cathode ray tube. The two luminescent screens have been arranged in such a manner that the pictures of the starting points 9 and 10 of the time sweep are at a distance of $a'$ and the directions of the time deflection are perpendicular in one instance and at a 45° angle in relation to the recording speed $v'$ in the other instance. The cathode ray tubes again are intensity-modulated, that is the impulse voltages are transmitted to the cathode cylinder, so that the cathode ray will only hit the luminescent screen and create a bright spot of light, which will be shown on a record chart 8, when the ultrasonic transformer emits an impulse or receives an echo. The circles 11 and 12 indicate the spots where dots of light would show up if the voltage at the cathode cylinder were sufficiently positive. They must be designated as imaginary dots of light or cathode ray points of impact and they move with the speeds of $c_1'$ or $c_2'$, respectively, whereas the speeds of the ultrasonic impulses 13 and 14 are $C_1$ or $C_2$, respectively. In the example, $a'=a$ and $v'=v$. In order that the faults 5, 6 and 7 be depicted according to scale through the imaginary dots of light, the speed of said dots in this example must be half as much as the speed of the ultrasonic impulses, or $$c_1' = \frac{c_1}{2} \text{ and } c_2' = \frac{c_2}{2}$$

In this manner picture 15 of fault 5 will develop, if $y'=Y$, because in moving the transducer 2 across the fault 5, during said movement the ultrasonic impulse runs through the path $2y$ with the speed $c_1$, the imaginary dot of light will sweep the path $$\frac{c_1}{2} \cdot \frac{2y}{c_1} = y$$

until it is modulated to a light condition through the echo impulse received from the cathode cylinder. The fault 6 is first of all detected by the transducer 3 because its ultrasonic impulses will strike the fault vertically and are then depicted in correct position through the dot of light 12 at 16. Possible weaker echoes through the vertical transducer 2, perhaps as the result of a rough surface of a crack, would also be shown at 16. The circular bore 7 is depicted through the vertical radiator 2 and through the imaginary dot of light 11 at 17, and through the angle radiator 3 at 17'. The dash-like representations 17 and 17', FIG. 3, correspond to the tangent sections at the circular bore 7. It is obvious that the bore 7 would be depicted still more perfectly if the combination 1 were supplemented by still other angle radiators, especially such with symmetrical distribution in angles. To addtional transducers corresponding light spot tracks are assigned.

In the example described, the image-ratio was 1:1. Generally the following relationships apply:

(1)          $a'=ka$
(2)          $v'=kv$
(3)          $\alpha'=\alpha$
(4)          $c_1' = \frac{k}{2} c_1$
(5)          $c_2' = \frac{k}{2} c_2$ If further angle transducers with the distances $a_1$, $a_2$, etc., with the angles of incidence of $\alpha_1$, $\alpha_2$ were added, then the relationships would be as follows:

$$a_1' = ka_1$$
$$a_2' = ka_2$$
$$a_n' = ka_n$$
$$\alpha_1' = \alpha_1$$
$$\alpha_2' = \alpha_2$$

etc.

If in some cases, a scale ratio $k_q$ were desired diagonally to the advance direction and a scale ratio of $k_l$ in the direction of advance, then the following relationships would be valid:

(6)    $\frac{a_1'}{a_1} = \frac{a_2'}{a_2} = \cdots = k_l$ (7)    $\frac{v'}{v} = k_l$      $k_l$ scale ratio in longitudinal direction (8)    $\frac{c' \sin \alpha'}{c \sin \alpha} = \frac{k_l}{2}$      $k_q$ scale ratio in transverse direction (9)    $\frac{c' \cos \alpha'}{c \cos \alpha} = \frac{k_q}{2}$      $\alpha$ any desired angle, $c$ any desired speed from (8) and (9) there follows:

(10)    $\frac{\tan \alpha}{\tan \alpha'} = \frac{k_q}{k_l}$

(11)    $c' = \frac{k_l}{2} c \left( \sin^2 \alpha + \frac{k_q^2}{k_l^2} \cos^2 \alpha \right)^{\frac{1}{2}}$ In the above-mentioned example it has been presupposed that the directions of expansion of the ultrasonic impulses are located in the plane which is determined by the perpendicular on the surface of the sample specimen and the direction of advance of the transducer combination. This supposition can even be extended to the effect that the directions of expansion of the impulses can be located in any desired plane, containing the direction of advance of the transducer combination.

The foregoing angular relationships are valid for the angles inside this plane. Thus by the designation of angle $\alpha$ in FIGS. 2 and 3, it is no longer the angle with the perpendicular line of the surface which is meant, but the angle with the vertical line in the direction of advance within the plane of the sonic ray. Oblique planes of sound rays will be used for example when recording faults in welded seams. FIG. 4 shows a cross section through a welded seam between two metal sheets 40 and 41. The ultrasonic transducer system is moved along parallel to this seam, therefore parallel to the plane in FIG. 4 along a straight line passing through point 19. All sound rays will be located in a plane 20, which lies perpendicular to the image plane, the position of said plane 20 in relation to the image plane being indicated through the dash-dot straight line of the section. The recording will show the distribution of the faults within the plane 20, and by changing the distance $x$, or the angle $\alpha$, the faults can be recorded at different levels of the welded seam.

There are various test specimens with parallel delimiting surfaces, as for example railroad rails, where the travel surface is located parallel to the bottom surface of the rail base. In that case, faulty spots are depicted a second time, and are reflected on the undersurface 21 of FIG. 5 where again the transducers 2 and 3 are moved over the plane-parallel specimen with a circular bore 7. The ultrasonic impulses emanating from the transducers 2 and 3 are reflected at the underside 21 of the test specimen. The impulses which have emanated from the vertical radiator 2 will again return their reflection, and in doing so, they will produce a picture 22 FIGURE 6 of the underside 21 every time through the brightness controlled light spot.

The backwall echo 22 is interrupted through the bore 7' at a point 23. The ultrasonic impulses emanating from the angle radiator 3 strike the bore 7 at two places. The corresponding paths 24 or 25, respectively, of the ultrasonic impulses have been indicated, and the paths 26 or 27, respectively, of the imaginary light impulses correspond to the paths 24 and 25. The echo-trail 28 does then represent the picture of the bore 7 in the vicinity of the surface element 29, and the echo-trail 28 is the replica of this surface element at the underside 21.

It is clear that the elimination of this replica will lead to a faster understanding and interpretation by the examiner of the fault, depicted by means of the recordings and this is accomplished again by depicting the paths 25 of the impulses in geometric similarity through the path of the imaginary light spots. For this purpose, the path 27 of the light spots, analogous to the deflection of the path of the impulses, is deflected upward at point 30, which corresponds to point 31 at the underside 21. In this manner the echo-trail 32 of the surface element 29 will now appear in its correct location. By using an additional angle transducer which under $-\alpha$, thus it would be from the right, will pick up the bore and by proper assignment of a path of spots of light, the surface elements of the bore 7, top right and bottom right, will be depicted as the corresponding tangential sections. When the angle transducers, radiating under $\pm \alpha°$, form a V- shaped path of rays, then the pertinent paths of the dots of light can be depicted together on a luminescent screen. This case is made clear by the example shown in FIGS. 7 and 8. Again, to the paths of the impulses, which emanate from radiators 3 and 33 and which converge after a reflection at the underside, the paths of the imaginary spots of light, which pass through at half the speed at the same scale, have been assigned. Whenever emitting of the impulses of the radiators 3 and 33 occurs simultaneously, the imaginary spots of light will also start simultaneously from the starting points 10 and 34, and in that case a two-ray oscillograph 46 would be needed. If transmission of impulses from 3 and 33 is accomplished alternatively, a one-ray oscillograph will be sufficient.

The advantage of the V-shaped path of rays is that now a second echo will be obtained from the undersurface 21, which will supplement the backwall echo 22 projecting from the vertical radiator, for example below the bore 7. The device therefore can explore at a spot where the impulse emanating from the vertical radiator 2 cannot reach.

In the cases described it may be desirable to record the backwall echoes of the various ultrasonic transformers separately through a slight distortion of the scale ratio $k_q$, so that from the different interruptions of the backwall echoes as a consequence of unsound spots, additional information could still be gathered with respect to the type of these defects which are causing a reduction of the backwall echoes.

In other cases it may be desirable to depict the echo trails of the different kinds of transducers separately, and in such cases the luminescent screens must be displaced obliquely to the direction of advance without any change taking place in the above mathematical relationships 1 through 11. Up until now a chronological change of the beam angle was not taken into consideration. In many cases however, such a procedure may offer advantages. The relationships 1 through 11 remain valid for the picture, even if the angle is assumed to be chronologically changeable.

The view of FIGURE 9 shows the synchronous relationship of the recording medium 8 and the transducer combination 1 in motion at velocity V—v' by means of the dot-dash connecting line. The chart is photo-responsive to the patterns 9 and 10 on cathode ray tubes 46 and 46' which are focussed thereon by lenses 50 and 50'. Spacing $a$ between the transducers is equal to spacing $a'$ between the points 9 and 10 on the cathode ray tubes at which the sweeps 51 and 51' begin, as shown by the dotted guide lines.

Beside the method of recording the pictures on the luminescent screen by means of light-sensitive strips of paper or of films, as shown in FIGURE 9 by way of example, any other known kind of recording would also be possible. Thus for example, the optical representation of the picture on the luminescent screen on the light-sensitive recording paper by means of an optical representation system may be dropped and either the paper or the film may be brought into direct contact with the luminescent screen. It is also possible to move the luminescent screen itself if optically it has a long enough afterglow. It is also possible to move the points where the cathode rays strike, in relation to the screen through a field intensity in proportion to the test path and causing a deflection of the cathode ray. The same can also be covered with a substance in a known manner by a mechanical movement of the one or several electrode systems of one or several cathode ray tubes, said substance resulting in a permanent recording, which could only be erased through a special process, as is the case in the so-called "Blue Writing." Finally it is also possible to do without a luminescent screen and the cathode ray may write directly on the recording film or paper.

I claim as my invention:
1. A device for the nondestructive testing of a workpiece by means of ultrasonic impulses while producing relative motion between the workpiece and at least a portion of said device comprising means for generating electric impulses, at least two transducers included in said relatively movable portion for scanning said workpiece each connected to said generating means, one of said transducers being positioned to direct ultrasonic impulses into said workpiece in a direction perpendicular to the surface of the workpiece, the other transducer being positioned a predetermined distance from said one transducer to direct ultrasonic impulses into said workpiece at an angle to the surface of the workpiece, separate receiver means connected to each transducer for receiving the direct ultrasonic impulses and the echoes of said impulses, a separate responsive means connected to each receiver means including a cathode ray oscillograph, the echoes of the defects of the workpiece to be examined appearing as lines of luminous spots on the screens of the oscillographs, a recording medium for recording said lines and means for linearly moving said medium adjacent to each cathode ray oscillograph at a predetermined velocity, wherein the ratio of the velocity of the recording medium to the relative velocity of the workpiece and a portion of said device is proportional to the ratio of the distance between the starting points of the time deflections recorded on the recording medium to the distance between the corresponding ultrasonic transducers.

2. A device as defined in claim 1, wherein the workpiece has a rear surface providing a reflection of ultrasonic impulses and the sweep of that one of the cathode ray coupled to the transducer directing impulses at an angle is deflected in a path in such direction and at such time that the reflections of impulses from the rear surface are depicted on the cathode ray screen to provide a recording on the recording surface of a remote surface of a discontinuity in the workpiece.

3. A device as defined in claim 1, including a further transducer coupled to scan the workpiece with an angle such that together with the first said transducer directing impulses at an angle, a substantially V-shaped path of rays is formed by the two angularly disposed transducers and each angular disposed transducer alternately receives the ultrasonic impulses, the further transducer being connected to the same cathode ray oscillograph as the first angularly disposed transducer, and deflection circuits in said same oscillograph to provide deflection currents in two directions respectively related in time to the transducer being impulsed to be equal to the angle of direction of impulses into the workpiece by the transducer being impulsed.

4. A device for the nondestructive testing of a workpiece by means of ultrasonic impulses while producing relative movement between said workpiece and a portion of said device comprising means for generating electric impulses, at least two transducers included in said relatively movable portion for scanning said workpiece each connected to said generating means, one of said transducers being positioned to direct ultrasonic impulses into said workpiece in a direction perpendicular to the surface of the workpiece, the other transducer being positioned to direct ultrasonic impulses into said workpiece at an angle to the surface of the workpiece, separate means connected to each transducer for receiving the direct ultrasonic impulses and the echoes of said impulses, the said means being each connected to a separate responsive means including a cathode ray oscillograph, the echoes of the defects of the workpiece to be examined appearing as a line of luminous spots on the screens of the oscillographs, a recording medium for recording said lines and means for moving said medium adjacent to each cathode ray oscillograph, wherein the ratio of the deflection speed of the spots on said screens as viewed in the plane of the recording medium to half the speed of the ultrasonic impulses is equal to the ratio of the speed of advance of the recording medium to the speed of relative movement between the workpiece and said portion of said device.

5. A device for the nondestructive testing of a workpiece by means of ultrasonic impulses while producing relative motion between said workpiece and a portion of said device comprising means for generating electric impulses, at least two transducers included in said relatively movable portion for scanning said workpiece each connected to said generating means, one of said transducers being positioned to direct ultrasonic impulses into said workpiece in a direction perpendicular to the surface of the workpiece, the other transducer being spaced from said one transducer and positioned to direct ultrasonic impulses into said workpiece at an angle to the surface of the workpiece, separate means connected to each transducer for receiving the direct ultrasonic impulses and the echoes of said impulses, the said means being each connected to a separate responsive means including a cathode ray oscillograph, the echoes of the defects of the workpiece to be examined appearing as a line of luminous spots on the screens of the oscillographs, a recording medium for recording said lines and means for advancing said medium adjacent to each cathode ray oscillograph, wherein the angles between the directions of the time deflections of the two cathode ray oscillographs and the direction of advance of the recording medium are equal to the angles between the directions of incidence of the corresponding ultrasonic impulses and the direction of advance of the workpiece, wherein the ratio of the velocity of the recording medium to the velocity of the workpiece is proportional to the ratio of the distance between the starting points of the time deflections recorded on the recording medium to the distance between the corresponding ultrasonic transducers and wherein the ratio of the deflection speed of the spots on said screen as viewed in the plane of the recording medium to half the speed of the ultrasonic impulses is equal to the ratio of the speed of advance of the recording medium to the speed of relative motion between the workpiece and said portion of said device.

References Cited in the file of this patent
UNITED STATES PATENTS
2,593,865    Erdman _____ Apr. 22, 1952
FOREIGN PATENTS
776,370    Great Britain _____ June 5, 1957